US009213686B2

(12) United States Patent
Arias et al.

(10) Patent No.: US 9,213,686 B2
(45) Date of Patent: Dec. 15, 2015

(54) SYSTEM AND METHOD FOR MANAGING A FORM COMPLETION PROCESS

(71) Applicant: WFH Properties LLC, Arlington Heights, IL (US)

(72) Inventors: Raymond Arias, Arlington Heights, IL (US); Jeffery L. Wilgus, Vernon Hills, IL (US); Nilmini Sunethra Wickramasinghe, Chicago, IL (US)

(73) Assignee: WFH PROPERTIES LLC, Arlington Heights, IL (US)

( * ) Notice: Subject to any disclaimer, the term of this patent is extended or adjusted under 35 U.S.C. 154(b) by 374 days.

(21) Appl. No.: 13/644,310

(22) Filed: Oct. 4, 2012

(65) Prior Publication Data

US 2013/0085744 A1 Apr. 4, 2013

Related U.S. Application Data

(60) Provisional application No. 61/543,132, filed on Oct. 4, 2011.

(51) Int. Cl.
*G06F 17/28* (2006.01)
*G06F 17/24* (2006.01)

(52) U.S. Cl.
CPC ............ *G06F 17/243* (2013.01); *G06F 17/289* (2013.01)

(58) Field of Classification Search
CPC . G06F 17/28; G06F 17/2809; G06F 17/2818; G06F 17/2827; G06F 17/2836; G06F 17/2846; G06F 17/2854; G06F 17/2863; G06F 17/2872; G06F 17/289; G06F 17/2881
USPC ....................................................... 704/2–8
See application file for complete search history.

(56) References Cited

U.S. PATENT DOCUMENTS

| 4,953,088 | A | | 8/1990 | Suzuki et al. |
| 5,351,189 | A | | 9/1994 | Doi et al. |
| 5,546,304 | A | | 8/1996 | Marschner et al. |
| 5,612,872 | A | | 3/1997 | Fujita |
| 5,852,798 | A | | 12/1998 | Ikuta et al. |
| 5,917,484 | A | | 6/1999 | Mullaney |
| 5,924,074 | A | | 7/1999 | Evans |
| 6,122,606 | A | * | 9/2000 | Johnson ............................ 704/7 |
| 6,347,329 | B1 | | 2/2002 | Evans |
| 7,359,861 | B2 | * | 4/2008 | Lee ................................ 704/277 |
| 7,970,598 | B1 | * | 6/2011 | Flanagan ............... G06F 17/289 704/2 |
| 8,239,185 | B2 | * | 8/2012 | Johnson ............................ 704/2 |
| 2001/0041991 | A1 | | 11/2001 | Segal et al. |
| 2002/0016721 | A1 | | 2/2002 | Mason et al. |

(Continued)

*Primary Examiner* — Lamont Spooner
(74) *Attorney, Agent, or Firm* — McAndrews, Held & Malloy, Ltd.

(57) ABSTRACT

Certain embodiments provide systems and methods for managing a form completion process. The method includes providing a user form in the selected language to a user interface. The method further includes receiving the user form with associated form answers and determining whether the selected language of the user form matches a service provider language. The method also includes queuing a work item associated with the user form with associated form answers if the selected language of the user form does not match the service provider language, and dequeuing the work item when the user form with associated form answers is provided to a translation specialist. The method includes receiving a translation of the user form with associated form answers and generating a provider form based on one or more of the user form with associated form answers and the translation of the user form with associated form answers.

37 Claims, 10 Drawing Sheets

(56) References Cited

U.S. PATENT DOCUMENTS

| | | | | |
|---|---|---|---|---|
| 2002/0016923 | A1 | 2/2002 | Knaus et al. | |
| 2002/0077994 | A1* | 6/2002 | Dombroski | 705/80 |
| 2002/0083103 | A1* | 6/2002 | Ballance | G06F 17/24 715/264 |
| 2002/0138306 | A1 | 9/2002 | Sabovich | |
| 2002/0156688 | A1* | 10/2002 | Horn et al. | 705/26 |
| 2002/0193983 | A1* | 12/2002 | Tokieda et al. | 704/2 |
| 2002/0194029 | A1 | 12/2002 | Guan et al. | |
| 2003/0088440 | A1 | 5/2003 | Dunn | |
| 2003/0120516 | A1 | 6/2003 | Perednia | |
| 2003/0146926 | A1* | 8/2003 | Valdes | G06F 17/217 715/703 |
| 2003/0208352 | A1* | 11/2003 | Lee | 704/2 |
| 2004/0172307 | A1 | 9/2004 | Gruber | |
| 2005/0050526 | A1* | 3/2005 | Dahne-Steuber | G06F 9/4448 717/136 |
| 2006/0074719 | A1 | 4/2006 | Horner | |
| 2006/0100850 | A1 | 5/2006 | Lee | |
| 2006/0184393 | A1* | 8/2006 | Ewin | G06F 19/363 705/2 |
| 2006/0216683 | A1* | 9/2006 | Goradia | 434/322 |
| 2007/0005643 | A1* | 1/2007 | Korman | 707/104.1 |
| 2007/0203754 | A1* | 8/2007 | Harrington | G06F 19/322 705/3 |
| 2008/0162112 | A1* | 7/2008 | Andersen et al. | 704/2 |
| 2010/0004918 | A1* | 1/2010 | Lee et al. | 704/3 |
| 2010/0042440 | A1* | 2/2010 | Joao | 705/3 |
| 2010/0070265 | A1* | 3/2010 | Nelson et al. | 704/8 |
| 2010/0198580 | A1* | 8/2010 | Klinefelter et al. | 704/3 |
| 2011/0112822 | A1* | 5/2011 | Caraher | 704/3 |
| 2011/0126275 | A1* | 5/2011 | Anderson et al. | 726/8 |
| 2011/0213625 | A1* | 9/2011 | Joao | 705/3 |
| 2011/0314054 | A1* | 12/2011 | Mault | G06Q 50/24 707/769 |
| 2012/0017146 | A1* | 1/2012 | Travieso | G06F 17/2827 715/265 |
| 2012/0035906 | A1* | 2/2012 | Jephcott | G06F 17/289 704/2 |
| 2013/0006654 | A1* | 1/2013 | Hermans | G06F 17/289 705/2 |

\* cited by examiner

MEDICAL/ SOCIAL/ FAMILY HISTORY

DATE: _____

LAST NAME: _____ FIRST NAME: _____ MI: _____

REASON FOR VISIT: _____

DOCTOR REQUESTING UROLOGIC CONSULTATION (REFFERING DR.):

NAME: _____

ADDRESS/CITY/STATE/ZIP: _____

PHONE: _____

MEDICAL HISTORY

A) Are you ALLERGIC to any medications?  Y / N
If YES, please name them: _____

B) Are you taking any medications?   Y / N    If YES, please name them and the dosage:

| MEDICATION | DOSAGE | MEDICATION | DOSAGE |
|---|---|---|---|
| Example: Aspirin | 3mg | | |
| | | | |
| | | | |

C) Do you take antibiotic medication for a heart valve, prosthesis, etc.?  Y / N If so what? _____

D) Have you been treated for any medical conditions like TB, diabetes, hypertension, cancer, heart condition, Rheumatic fever, etc. ?  Y / N    If YES, please describe below:

| DISEASE | FIRST TREATED | PHYSICIAN | LAST CHECK-UP |
|---|---|---|---|
| EXAMPLE: High Blood Pressure | around 1975 | Dr. Albert Jones | NOV. 1991 |
| | | | |
| | | | |
| | | | |

E) Have you ever had surgery?   Y / N    If YES, please list below:

| SURGERY | DATE | SURGEON |
|---|---|---|
| | | |
| | | |

F) Have you ever had a blood transfusion?   Y / N   If YES, when? _____

G) Have you ever had a reaction to anesthesia?  Y / N  _____

H) If you are a female, when was your last menstrual period? _____

Have you ever been pregnant? Y / N   If YES, how many times: _____

FIG. 6A (PRIOR ART)

SOCIAL HISTORY

A) Do you smoke?   Y / N   If YES, how many packs a day?_____

If you have quit, how long ago did you stop? _____

B) Do you drink alcohol?   Y / N   If YES, how much per week?_____

C) What is your occupation? _____

D) Marital status:   ___Single   ___Married   ___Divorced   ___Widow/ Widower

If married, name of spouse: _____

Children:   M / F Age  _____      M / F Age  _____

M / F Age  _____      M / F Age  _____

M / F Age  _____      M / F Age  _____

M / F Age  _____      M / F Age  _____

FAMILY HISTORY

Father's age: _____     Mother's age: _____

If deceased, at what age? _____     If deceased, at what age? _____

Cause of his death? _____     Cause of her death? _____

I have information on my birth father:  Y / N     I have information on my birth mother:  Y / N How many brothers do you have? _____     How many sisters do you have? _____

Do any of them have any major illnesses?  Y / N     Do any of them have any major illnesses?  Y / N If YES, what is the illness? _____     If YES, what is the illness? _____

Have any of them died from a major illness?  Y / N     Have any of them died from a major illness?  Y / N If YES, what is the illness? _____     If YES, what is the illness? _____

REVIEW OF SYSTEMS

What is your height? _____     What is your weight? _____

Is your general health good?   Y / N          If NO, please explain: _____

FIG. 6B (PRIOR ART)

Review of Systems

Date: _____

PATIENT NAME: _____

Please check any of the following symptoms that are currently bothering you, or have been a problem in the past.

| HEAD/EARS/EYES NOSE/THROAT/MOUTH | GENITOURINARY | ABDOMEN |
|---|---|---|
| ☐ Headaches | ☐ Frequent Urination | ☐ Frequent Indigestion |
| ☐ Dizziness | ☐ Urgency | ☐ Nausea |
| ☐ Migraines | ☐ Hesitancy | ☐ Vomiting |
|  | ☐ Intermittency | ☐ Diarrhea |
| ☐ Earaches | ☐ Incomplete Bladder Emptying | ☐ Constipation |
| ☐ Ringing in Ears | ☐ Incontinence | ☐ Any Change in Bowel Habits |
| ☐ Ear Infections | ☐ Nocturia (___ times per night) | ☐ Blood in Stool |
| ☐ Decreased Hearing | ☐ Blood in Urine | ☐ Colitis |
|  | ☐ Painful Urination | ☐ Ulcers |
| ☐ Double Vision | ☐ Weak Size & Force of Stream | ☐ Burning |
| ☐ Loss of Vision |  | ☐ Hemorrhoids |
| ☐ Blurred Vision | CHEST | ☐ Hernias/ Hernia Surgery |
| ☐ Frequent Eye Infections | ☐ Chronic Cough |  |
|  | ☐ Frequent Cough | LOWER EXTREMITIES |
| ☐ Frequent Sinus Congestion | ☐ Cough up Blood | ☐ Arthritis |
| ☐ Nose Bleeds | ☐ Shortness of Breath | ☐ Back or Neck Problems |
| ☐ Frequent Sore Throats | ☐ History of Asthma | ☐ Joint Disease |
| ☐ Frequent Colds | ☐ Pneumonia | ☐ Sciatica |
|  | ☐ Tuberculosis |  |
| ☐ Dental Problems | ☐ Frequent Bronchitis | SKIN |
|  |  | ☐ Rashes |
| NECK | HEART | ☐ Abnormal Lumps |
| ☐ Stiffness | ☐ Tightness or Pressure, Discomfort in Chest | ☐ Abnormal Moles |
| ☐ Pain | ☐ Discomfort in Jaw or Neck | ☐ Dermatitis |
| ☐ Lumps | ☐ Any Discomfort in Left Arm | ☐ Any Skin Problems |
| ☐ Difficulty Swallowing | ☐ Any Discomfort when Exercising |  |
|  | ☐ Murmurs | CONSTITUTIONAL |
| ENDOCRINE | ☐ Palpitations | ☐ Fainting |
| ☐ Any Thyroid Problems | ☐ Skipped Beats | ☐ Loss of Consciousness |
| ☐ Diabetes | ☐ Swelling of Feet | ☐ Epilepsy |
|  | ☐ High Blood Pressure | ☐ Seizures |
|  | ☐ Varicose Veins | ☐ Numbness |
|  |  | ☐ Tingling |
|  |  | ☐ Loss of Coordination |
|  |  |  |
|  |  | WOMEN |
|  |  | ☐ Breast Lumps |
|  |  | ☐ Vaginal Discharge |
|  |  | ☐ Abnormal Bleeding |

FIG. 6C (PRIOR ART)

Questions Matrix:

FIG. 7A

| Question # | Depends On | Section # | Section Name | Question Type | Question |
|---|---|---|---|---|---|
| 1 | | 1 | Introduction | Date | Date? |
| 2 | | 1 | Introduction | Free Form | Last Name? |
| 3 | | 1 | Introduction | Free Form | First Name? |
| 4 | | 1 | Introduction | Free Form | Middle Initial? |
| 5 | | 2 | Referral | Free Form | What is the name of the Doctor who referred you for this visit? |
| 6 | | 2 | Referral | Free Form | Address? |
| 7 | | 2 | Referral | Free Form | City? |
| 8 | | 2 | Referral | Free Form | State? |
| 9 | | 2 | Referral | Free Form | Zip? |
| 10 | | 2 | Referral | Free Form | Phone? |
| 11 | | 3 | Medical History | Y/N | Are you ALERGIC to any medications? |
| 12 | 11 | 3 | Medical History | Free Form | If YES, please name them. |
| 13 | | 3 | Medical History | Y/N | Are you taking any Medications? |
| 14 | 13 | 3 | Medical History | Free Form | Medication? (times 6 form locations for entry) |
| 15 | 13 | 3 | Medical History | Free Form | Dosage? (times 6 form locations for entry) |
| 16 | | 3 | Medical History | Y/N | Do you take antibiotic medication for a heart valve, prothesis, etc.? |
| 17 | 16 | 3 | Medical History | Free Form | If so, what? |
| 18 | | 3 | Medical History | Y/N | Have you been treated for any medical condition like TB, diabetes, hypertention, cancer, heart condition, Rheumatic Fever, etc.? |
| 19 | 18 | 3 | Medical History | Free Form | Disease? (times 4 form locations for multiple entry) |
| 20 | 18 | 3 | Medical History | Date | First Treated? (times 4 form locations for multiple entry) |
| 21 | 18 | 3 | Medical History | Free Form | Physician? (times 4 form locations for multiple entry) |
| 22 | 18 | 3 | Medical History | Date | Last Check-up? (times 4 form locations for multiple entry) |
| 23 | | 3 | Medical History | Y/N | Have you ever had surgery? |
| 24 | 23 | 3 | Medical History | Free Form | Surgery? (times 3 form locations for multiple entry) |
| 25 | 23 | 3 | Medical History | Date | Date? (times 3 form locations for multiple entry) |
| 26 | 23 | 3 | Medical History | Free Form | Surgeon? (times 3 form locations for multiple entry) |
| 27 | | 3 | Medical History | Y/N | Have you ever had a blood transfusion? |
| 28 | 27 | 3 | Medical History | Date | When? |
| 29 | | 3 | Medical History | Y/N | Have you ever had a reaction to anethesia? |
| 30 | | 3 | Medical History | Date | If you are female, when was your last menstrual period? |
| 31 | | 3 | Medical History | Y/N | Have you every been pregnant? |
| 32 | 31 | 3 | Medical History | Integer | How many times? |
| 33 | | 4 | Social History | Y/N | Do you smoke? |
| 34 | 33 | 4 | Social History | Integer | How many packs a day? |
| 35 | 33 | 4 | Social History | Date | If you have quit, how long ago did you stop? |
| 36 | | 4 | Social History | Y/N | Do you drink alchohol? |
| 37 | 36 | 4 | Social History | Free Form | If YES, how much per week? |
| 38 | | 4 | Social History | Free Form | What is your occupation? |
| 39 | | 4 | Social History | Choice | Marital Status: Single, Married, Divorced, Widow/Widower |
| 40 | 39 | 4 | Social History | Free Form | If married, name of Spouse? |
| 41 | | 4 | Social History | Choice | Child Sex: Male or Female (times 8 form locations for multiple entry) |
| 42 | | 4 | Social History | Integer | Chils Age? (times 8 form locations for multiple entry) |
| 43 | | 5 | Family History | Integer | Father's Age? |
| 44 | 43 | 5 | Family History | Integer | If deceased, how old? |
| 45 | 44 | 5 | Family History | Free Form | Cause of his death? |
| 46 | | 5 | Family History | Y/N | I have information on my birth father? |
| 47 | | 5 | Family History | Integer | Mother's Age? |
| 48 | 47 | 5 | Family History | Integer | If deceased, how old? |
| 49 | 48 | 5 | Family History | Free Form | Cause of her death? |
| 50 | | 5 | Family History | | |
| 51 | | 5 | Family History | Y/N | I have information on my birth mother? |
| 52 | | 5 | Family History | Integer | How many brothers do you have? |
| 53 | 52 | 5 | Family History | Y/N | Do any of them have any major illnesses? |
| 54 | 53 | 5 | Family History | Free Form | If YES, what is the illness? |
| 55 | 52 | 5 | Family History | Y/N | Have any of them died from a major illness? |
| 56 | 55 | 5 | Family History | Free Form | If YES, what is the illness? |
| 57 | | 5 | Family History | Integer | How many sisters do you have? |
| 58 | 57 | 5 | Family History | Y/N | Do any of them have any major illnesses? |
| 59 | 58 | 5 | Family History | Free Form | If YES, what is the illness? |
| 60 | 57 | 5 | Family History | Y/N | Have any of them died from a major illness? |
| 61 | 60 | 5 | Family History | Free Form | If YES, what is the illness? |
| 62 | | 6 | Review of Systems | Integer | Heigh: Feet? |
| 63 | 62 | 6 | Review of Systems | Integer | Inches? |
| 64 | | 6 | Review of Systems | Integer | What is your weight? |
| 65 | | 6 | Review of Systems | Y/N | Is your general health good? |
| 66 | 65 | 6 | Review of Systems | Free Form | If NO, please explain? |
| 67 | | 6 | Review of Systems | Check Boxes | Please check any of the following symptoms that are currently bothering you, or have been a problem in the past: |

Question 67 Check-Box Sections:

Section: Head / Ears / Eyes / Nose / Throat / Mouth
Headeachs
Diziness
Migraines
Earaches
Ringing in the Ears
Ear Infections
Decreased hearing
Double Vision
Loss of Vision
Blurred Vision
Frequent Eye Infections
Frequent Sinus Conjestion
Nose Bleeds
Frequent Sore Throat
Frequent Colds
Dental Problems

Section: Neck
Stiffness
Pain
Lumps
Difficulty Swallowing

Section: Endocrine
Any Thyroid Problems
Diabetes

Section: Genitourinary
Frequent Urination
Urgency
Hesitency
Intermittency
Incomplete Bladder Emptying
Incontinence
Nocturia
How Many Times per Night? (If Nocturia is checked)
Blood in Urine
Painful Urination
Weak Size & Force of Stream

Section: Chest
Cronic Cough
Frequent Cough
Cough up Blood
Shortness of Breath
History of Asthma
Pneumonia
Tuberculosis
Frequent Bronchitis

Section: Heart
Tightness or Pressure, Discomfort in Chest
Discomfort in Jaw or Neck
Any Discomfort in Left Arm
Any Discomfort When Exercising
Murmurs
Palpitations
Skipped Beats
Swelling of Feet
High Blood Pressure
Varicose Veins

Section: Abodomen
Frequent Indigestion
Nausea
Vomiting
Diarrhea
Constipation
Any Change in Bowel Habits
Blood In Stool
Colitis
Ulcers
Burning
Hemorroids
Hernias / Hernia Surgery

Section: Lower Extremedies
Arthritis
Back or Neck Problems
Joint Disease
Sciatica

Section: Skin
Rashes
Abnormal Lumps
Abnormal Moles
Dermatitis
Any Skin Problems

Section: Constitutional
Fainting
Loss of Consciousness
Epilepsy
Seizures
Numbness
Tingling
Loss of Coordination

Section: Women
Breat Lumps
Vaginal Discharge
Abnormal Bleeding

FIG. 7B

SYSTEM AND METHOD FOR MANAGING A FORM COMPLETION PROCESS

CROSS-REFERENCE TO RELATED APPLICATIONS/INCORPORATION BY REFERENCE

This patent application makes reference to, claims priority to and claims benefit from U.S. Provisional Patent Application Ser. No. 61/543,132, entitled "System and Method for Managing a Form Completion Process," filed on Oct. 4, 2011, the complete subject matter of which is hereby incorporated herein by reference, in its entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

The present invention generally relates to a system and method for managing a form completion process. More specifically, certain embodiments provide a form in a first language for completion by a user that speaks the first language. The form, completed by the user in the first language, is received and translated into a second language of a service provider. The translated form may be communicated to, or accessed by, the service provider.

Currently, if a person does not speak a primary language of a service provider, the communication of information, needed to provide a service, from the person to the service provider may be difficult. For example, in a healthcare environment, patient intake forms are completed by patients to provide information regarding the patient and the reason for a particular visit. When a patient does not speak the primary language of the healthcare facility (e.g., English), the patient may need the assistance of someone at the healthcare facility to assist the patient in filling out the intake forms. However, depending on the proficiency of the individual assisting the patient, the process of receiving assistance is prone to quality errors that may even result in inaccurate medical diagnoses if the information on the form has not been entered correctly or translated correctly for the medical practitioner. Additionally, the process of receiving assistance translates into longer service times in the healthcare facility for a person that does not speak the primary language of the healthcare facility.

Further, even if a healthcare facility employed individuals or a service for providing translations on site, with over 300 hundred languages spoken in the United States, for example, there is no guarantee that the individual or service would have the capability to accurately provide the needed translation. Also, it may be a large expense for a healthcare facility to have individuals or a service on site to provide translations.

Thus, there is a need for an accurate, cost effective system and method for managing the completion of forms by a user in a first language for translation and access to a service provider in a second language.

Further limitations and disadvantages of conventional and traditional approaches will become apparent to one of skill in the art, through comparison of such systems and methods with the present invention as set forth in the remainder of the present application with reference to the drawings.

BRIEF SUMMARY OF THE INVENTION

A system and method for managing the completion of forms by a user in a first language for translation and access to a service provider in a second language are provided, substantially as shown in and/or described in connection with at least one of the figures, as set forth more completely in the claims.

These and other advantages, aspects and novel features of the present invention, as well as details of illustrative aspects thereof, will be more fully understood from the following description and drawings.

BRIEF DESCRIPTION OF SEVERAL VIEWS OF THE DRAWINGS

FIG. 6A depicts an exemplary paper patient intake form as is known in the art.

FIG. 6B depicts an exemplary paper patient intake form as is known in the art.

FIG. 6C depicts an exemplary paper patient intake form as is known in the art.

FIG. 7A depicts an exemplary questions matrix used in accordance with an embodiment of the present technology.

FIG. 7B depicts an exemplary check-box section corresponding to the questions matrix illustrated in FIG. 7A as used in accordance with an embodiment of the present technology.

Figure 1:
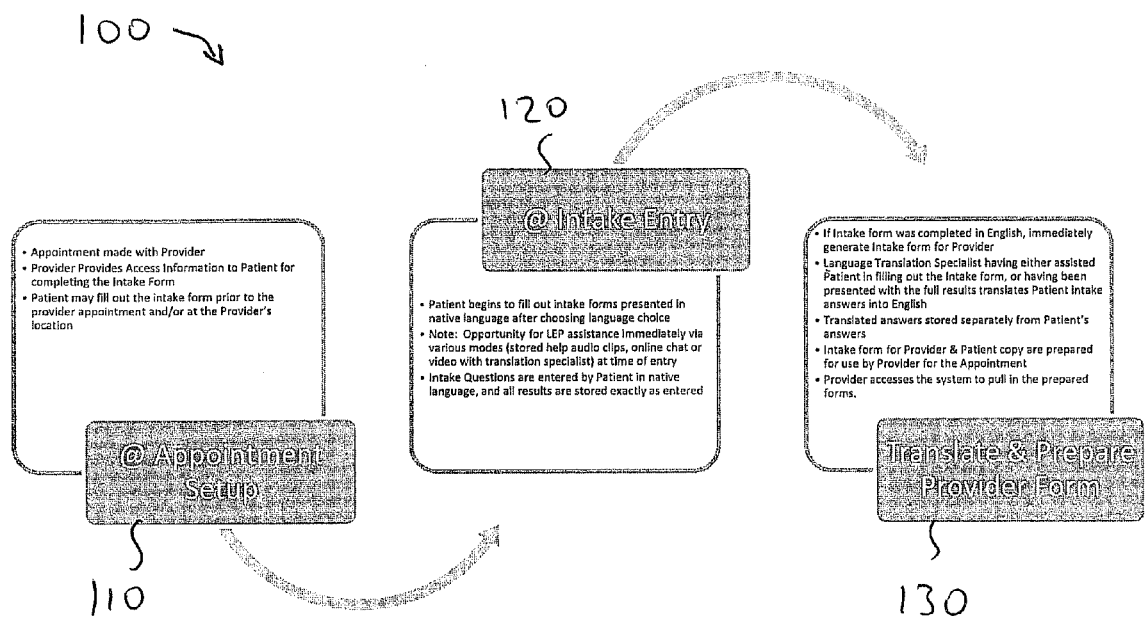
FIG. 1 is a flow diagram that illustrates an exemplary method for managing a form completion process used in accordance with an embodiment of the present technology.

The foregoing summary, as well as the following detailed description of certain embodiments of the present invention, may be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION

Certain embodiments of the present invention relate to a system and method for providing a form in a first language for completion by a user that speaks the first language. The form, completed by the user in the first language, is received and translated into a second language of a service provider. The translated form may be communicated to, or accessed by, the service provider.

Various embodiments provide a method 100, 200 for managing a form completion process. The method 100, 200 comprises providing 120, 230 a user form 421 in a selected language from a form management computing device 300, 400 to a user interface. The method 100, 200 comprises receiving 120, 130 the user form with associated form answers at a form management computing device 300, 400 and determining 130, 240 whether the selected language of the user form matches a service provider language. The method 100, 200 comprises queuing 130, 250 a work item associated with the user form with associated form answers if the selected language of the user form does not match the service provider language, and dequeuing 130, 250 the work item when the user form with associated form answers is provided to a translation specialist. The method 100, 200 comprises receiving 130, 250 a translation of the user form with associated form answers at the form management computing device and generating 130, 260 a provider form based on at least one of the user form with associated form answers and the translation of the user form with associated form answers.

Certain embodiments provide a non-transitory computer-readable medium encoded with a set of instructions 100, 200 for execution on a computer. The set of instructions 100, 200 comprise a presentation routine configured to provide 120, 230 a user form in a selected language to a user interface. The set of instructions 100, 200 comprise a completed form routine configured to receive 120, 230 the user form with associated form answers and a language determination routine configured to determine 130, 240 whether the selected language of the user form matches a service provider language. The set of instructions 100, 200 comprise a queuing routine configured to queue 130, 250 a work item associated with the user form with associated form answers if the selected language of the user form does not match the service provider language, and a dequeuing routine configured to dequeue 130, 250 the work item when the user form with associated form answers is provided to a translation specialist. The set of instructions 100, 200 comprise a translated form routine configured to receive 130, 250 a translation of the user form with associated form answers, and a generation routine configured to generate 130, 260 a provider form based on at least one of the user form with associated form answers and the translation of the user form with associated form answers.

Various embodiments provide a system 300, 400 for managing a form completion process. The system 300, 400 comprises one or more user interfaces 302-306, 411-413 and a processing engine 314, 432-433. The one or more user interfaces 302-306, 411-413 are configured to provide a user form in a selected language and receive the user form with associated form answers. The one or more user interfaces 302-306, 411-413 are configured to provide the user form with associated answers to a translation specialist and receive a translation of the user form with associated form answers. The processing engine 314, 432-433 is configured to determine whether the selected language of the user form matches a service provider language. The processing engine 314, 432-433 is configured to queue a work item associated with the user form with associated form answers if the selected language of the user form does not match the service provider language. The processing engine 314, 432-433 is configured to dequeue the work item when the user form with associated form answers is provided to a translation specialist. The processing engine 314, 432-433 is configured to generate a provider form based on one or more of the user form with associated form answers and the translation of the user form with associated form answers.

FIG. 1 is a flow diagram that illustrates an exemplary method for managing a form completion process used in accordance with an embodiment of the present technology. Referring to FIG. 1, there is shown a flow diagram 100, which illustrates exemplary steps for managing a form completion process. At step 110, a user is provided with system access information such that the user may access a user form in the user's native language. At step 120, a user accesses and completes the user form in the user's native language. At step, 130, a provider form, corresponding to the completed user form, is prepared in the provider's native language. Although the method is described with reference to the exemplary elements of the systems described below, it should be understood that other implementations are possible.

At step 110, a user is provided with system access information such that the user may access a user form in the user's native language. For example, in a healthcare environment, a patient may make an appointment with a healthcare provider. The healthcare provider may direct the patient to fill out intake forms prior to the appointment by using the form management system 300 (as illustrated, for example, in FIG. 3). In an embodiment, the system access information may include patient login information, information for creating a patient login, information related to the healthcare facility, and/or any other suitable system access information.

Certain embodiments provide that the form management system 300 may be accessed over a network (e.g., the Internet) from any suitable computing device with access to the network. For example, a user may access the form management system 300 via a network using a desktop computer, a laptop computer, a tablet computer, a mobile phone, smartphone, personal digital assistant (PDA), or any other suitable device with network access.

In an embodiment, the healthcare facility may have various devices available for patients to access the form management system 300 if a patient does not complete the intake forms using the form management system 300 prior to arriving at the healthcare facility for the appointment. For example, the healthcare facility may have kiosks, workstations, or the like, where a patient may access the form management system 300.

Additionally or alternatively, paper patient intake forms may be provided, preferably in the patient's native language if possible, for completion by the patient. Examples of paper patient intake forms in English as are known in the art are illustrated in FIGS. 6A-6C. In certain embodiments, the healthcare facility or the patient may print out paper versions of the forms in a patient's native language from the form management system 300 for completion by the patient.

At step 120, a user accesses and completes the user form in the user's native language. For example, in a healthcare environment, a patient may log into the form management system 300 using the system access information provided at step 110. The form management system 300 may provide the patient with language choices, such that the patient may select the patient's native language. Additionally or alternatively, a healthcare facility may designate a patient's native language when creating an intake work item in the form management system 300 when a patient sets up an appointment at the healthcare facility. Based on the native language selected by the patient or the healthcare facility, the patient is presented with one or more forms in the patient's native language at the user interface of the patient's computing device.

In certain embodiments, various form completion tools may also be presented to the patient, or otherwise are accessible to the patient, to assist the patient with completing the form. For example, audio clips, video clips, instructional text, live "chat" assistance, and/or any other suitable form completion tools may be accessible in the patient's native language for selection and presentation on the patient's user interface. The form completion tools may be accessible to a user for selection using buttons, drop-down menus, and/or any other suitable selection mechanisms. The selection mechanisms for the form completion tools may be integrated into the presented form and/or are otherwise accessible to the patient via the user interface. For example, selection mechanisms for form completion tools may be strategically placed within the form to assist in providing help related to specific form questions or sections of the form, among other things. As another example, selection mechanisms for form completion tools may be accessible using toolbars, icons, windows, or the like, and may be situated at any suitable location within the user interface of the patient's computing device.

Certain embodiments provide that the one or more forms are presented to a user in the user's native language at the user's user interface. The forms may provide different question types to the user. For example, as illustrated in FIGS. 7A-7B, the questions presented in the one or more form may request date answers, integer answers (e.g., age, weight, etc.), single choice answers (e.g., "Yes" or "No'; "Male" or "Female"; "Single", "Married", "Divorced" or "Widow/Widower"; etc.), multiple choice answers (e.g., "Check all symptoms that are bothering you:", etc.), free form, and/or any other suitable question types. The one or more forms are completed by the user in the user's native language. The answers provided by the user are stored in the form management system 300 as entered by the user.

In certain embodiments, the form questions may be presented to the user individually or as groups of questions, among other things The presentation of certain questions may be dependent upon answer to other questions. For example, as illustrated in the exemplary questions matrix of FIG. 7A, a question may be presented to a patient asking whether the patient is allergic to any medications. If the patient indicates that he or she is not allergic to any medications, the form management system 300 may skip the question asking to name the medications the patient is allergic to.

Certain embodiments provide that a user may complete paper forms in addition to, or instead of, the forms electronically provided via the form management system 300. The paper forms may be provided by the service provider and/or be printable from the form management system 300, preferably in the user's native language if possible, for completion by the user. Examples of paper patient intake forms in English as are known in the art are illustrated in FIGS. 6A-6C.

After completion of the paper form by the user, the completed paper form may be uploaded, or otherwise stored, to the form management system 300. For example, a user or service provider may upload or otherwise store the completed paper form to the form management system 300. Additionally or alternatively, the paper form may be communicated by electronic mail, facsimile, mail or any other suitable manner of communication to a system administrator or any other suitable agent with access to the form management system 300 for uploading or otherwise storing the paper form to the form management system 300. Additionally or alternatively, the answers provided in the completed form may be stored in the form management system 300 with or without a copy of the completed paper form. If the answers provided in the completed form are entered in the form management system 300, it is preferable that the actual completed paper form be kept in some form as a record of the actual answers as provided by the user.

At step 130, a provider form, corresponding to the completed user form, is prepared in the provider's native language. The form management system 300 may initially determine whether the user form completed in the user native language matches the service provider native language. If the user and service provider native languages match, the form management system 300 may generate a provider form in a suitable format and comprising the questions and answers of the user form completed by the user. The generated provider form or a message indicating that the provider form is available, may be communicated to the service provider via upload to a service provider system, electronic mail, facsimile, mail and/or any other suitable manner of communication. Additionally or alternatively, the provider form may be accessible for viewing, printing and/or download, among other things, by the service provider at the form management system 300.

In certain embodiments, if the user form completed in the user native language does not match a service provider native language, the form management system 300 may send a work item for translating the user form to a queue. In certain embodiments, the queue may be one of a plurality of queues. The form management system 300 may select the queue for sending the work item based on a priority of work item, the language of the user form associated with the work item, the identity of the service provider, the available translation specialists, and/or any other suitable properties of the work item. For example, a work item associated with a completed user form for an appointment in a week may be placed in a lower priority queue than a work item associated with a completed user form for an appointment in under an hour. Additionally or alternatively, a work item associated with a completed user form to be translated from Spanish to English may be sent to a different queue than a work item associated with a completed user form to be translated from Chinese to English. In certain embodiments, queues may be any combination of a first-in-first-out queues and/or last-in-first-out queues (i.e., stacks). The form management system 300 may manage the order queues are serviced using, for example, weighted fair queuing (WFQ), strict priority, class-based queuing (CBQ), class-based weighted fair queuing (CBWFQ), and/or any other suitable queue-servicing algorithm. The work items in the queue may be continuously monitored by the form management system 300 to update queues if circumstances associated with the work item change, among other things. For example, as an appointment time draws nearer, a work item originally placed in a lower priority queue that has yet to be serviced may be moved to a higher priority queue.

Certain embodiments provide that the work items associated with the completed user form that need translation are acted upon by translation specialists and/or any suitable translation mechanism. In certain embodiments, if the user worked with a live "chat" assistance specialist while completing the user form on the form management system 300, the live "chat" assistance specialist may be tasked with translating the completed user form. In certain embodiments, the form management system 300 automatically translates data of a known format. For example, answers provided as one or more of dates, integers, check boxes, radio buttons, drop-down menus, list boxes, and the like, may be automatically translated. In certain embodiments, translations of free form answers (including dates and integers in some embodiments) provided by a user in the user form may be translated by a translation specialist, for example. In certain embodiments, translated answers do not replace the user answers but are stored alongside the user answers to maintain a record of the user provided answers, among other things.

After a completed user form is translated, the form management system 300 may generate a provider form in a suitable format and comprising the questions and answers of the user form completed by the user in the provider native language. The generated provider form or a message indicating that the provider form is available, may be communicated to the service provider via upload to a service provider system, electronic mail, facsimile, mail and/or any other suitable manner of communication. Additionally or alternatively, the provider form may be accessible for viewing, printing and/or download, among other things, by the service provider at the form management system 300. Further, the service provider may be provided with, or otherwise have access to, the completed user form in the user native language.

Figure 2:
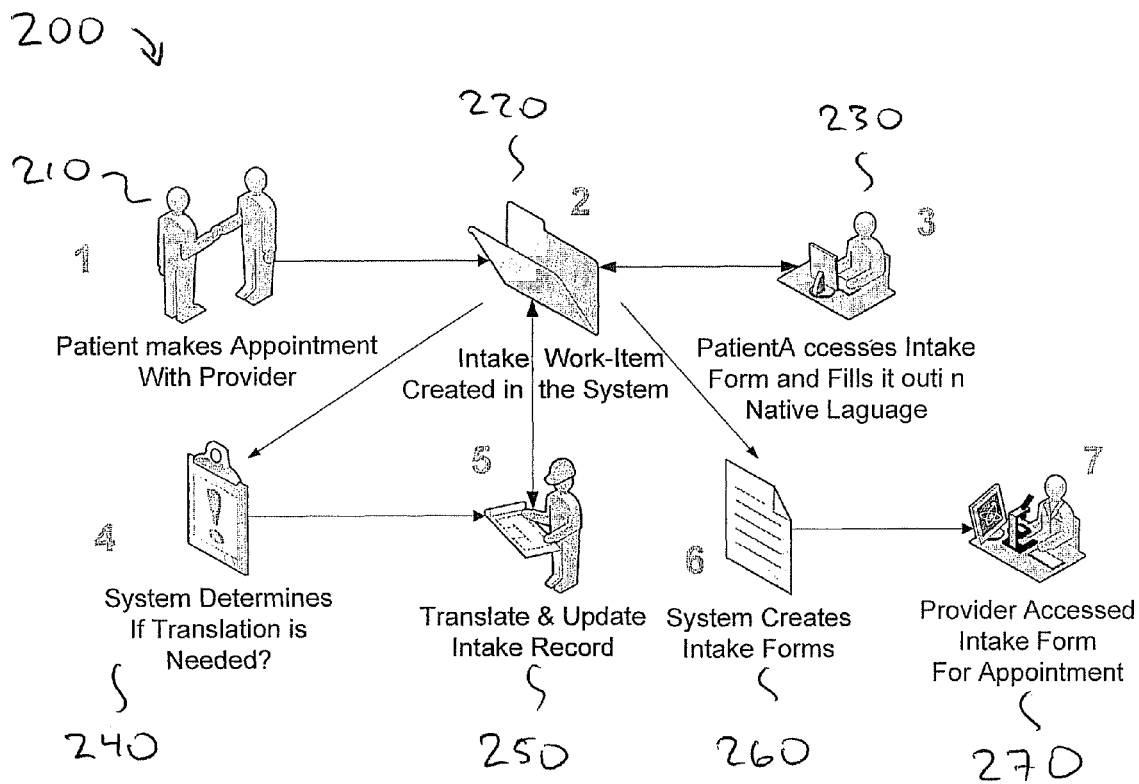
FIG. 2 is a flow diagram that illustrates an exemplary method for managing a form completion process used in accordance with an embodiment of the present technology.

FIG. 2 is a flow diagram that illustrates an exemplary method for managing a form completion process used in accordance with an embodiment of the present technology. Referring to FIG. 2, there is shown a flow diagram 200, which illustrates exemplary steps for managing a form completion process. At step 210, a user makes an appointment with a service provider. At step 220, a work item is created in a form management system. At step 230, the user accesses and completes a form in the user's native language. At step 240, the form management system determines if translation of the completed user form is needed. At step 250, if translation of the completed user form is needed, the completed user form is translated and form management system is updated. At step 260, the form management system generates a provider form based on the completed user form and/or the translation of the completed user form. At step 270, the generated provider form is provided to the service provider for the scheduled appointment. Although the method is described with reference to the exemplary elements of the systems described below, it should be understood that other implementations are possible.

At step 210, a user makes an appointment with a service provider. For example, in a healthcare environment, a patient may make an appointment with a healthcare provider. The healthcare provider may direct the patient to fill out the intake forms prior to the appointment by using the form management system 300 (as illustrated, for example, in FIG. 3). In an embodiment, a user is provided with system access information such that the user may access a user form in the user's native language. The system access information may include patient login information, information for creating a patient login, information related to the healthcare facility, and/or any other suitable system access information.

At step 220, a work item is created in a form management system. In certain embodiments, the work item may be created in response to a service provider notifying the form management system 300 of the scheduled appointment. Additionally or alternatively, the work item may be created in response to a user registering or logging in, among other things, at the form management system 300. In certain embodiments, a work item may be created in response to a completed paper form being uploaded or entered in the form management system 300. The work item may be used by the form management system to track the status of the form completion process, among other things.

At step 230, the user accesses and completes a form in the user's native language. The form management system 300 may be accessed over a network (e.g., the Internet) from any suitable computing device with access to the network. For example, a user may access the form management system 300 via the network using a desktop computer, a laptop computer, a tablet computer, a mobile phone, smartphone, personal digital assistant (PDA), or any other suitable device with network access.

In an embodiment, the healthcare facility may have various devices available for patients to access the form management system 300 if a patient does not complete the intake forms using the form management system 300 prior to arriving at the healthcare facility for the appointment. For example, the healthcare facility may have kiosks, workstations, or the like, where a patient may access the form management system 300.

Additionally or alternatively, paper patient intake forms may be provided, preferably in the patient's native language if possible, for completion by the patient. Examples of paper patient intake forms in English as are known in the art are illustrated in FIGS. 6A-6C. In certain embodiments, the healthcare facility or the patient may print out paper versions of the forms in a patient's native language from the form management system 300 for completion by the patient.

In a healthcare environment, a patient may register and/or log into the form management system 300. The form management system 300 may provide the patient with language choices, such that the patient may select the patient's native language. Additionally or alternatively, a healthcare facility may designate a patient's native language when creating the work item in the form management system 300. Based on the native language selected by the patient or the healthcare facility, the patient is presented with one or more forms in the patient's native language at the user interface of the patient's computing device.

In certain embodiments, various form completion tools may also be presented to the patient, or otherwise are accessible to the patient, to assist the patient with completing the form. For example, audio clips, video clips, instructional text, live "chat" assistance, and/or any other suitable form completion tools may be accessible in the patient's native language for selection and presentation on the patient's user interface. The form completion tools may be accessible to a user for selection using buttons, drop-down menus, and/or any other suitable selection mechanisms. The selection mechanisms for the form completion tools may be integrated into the presented form and/or are otherwise accessible to the patient via the user interface. For example, selection mechanisms for form completion tools may be strategically placed within the form to assist in providing help related to specific form questions or sections of the form, among other things. As another example, selection mechanisms for form completion tools may be accessible using toolbars, icons, windows, or the like, and may be situated at any suitable location within the user interface of the patient's computing device.

Certain embodiments provide that the one or more forms are presented to a user in the user's native language at the user's user interface. The forms may provide different question types to the user. For example, as illustrated in FIGS. 7A-7B, the questions presented in the one or more form may request date answers, integer answers (e.g., age, weight, etc.), single choice answers (e.g., "Yes" or "No"; "Male" or "Female"; "Single", "Married", "Divorced" or "Widow/Widower"; etc.), multiple choice answers (e.g., "Check all symptoms that are bothering you:", etc.), free form, and/or any other suitable question types. The one or more forms are completed by the user in the user's native language. The answers provided by the user are stored in the form management system 300 as entered by the user.

In certain embodiments, the form questions may be presented to the user individually or as groups of questions, among other things The presentation of certain questions may be dependent upon answer to other questions. For example, as illustrated in the exemplary questions matrix of FIG. 7A, a question may be presented to a patient asking whether the patient is allergic to any medications. If the patient indicates that he or she is not allergic to any medications, the form management system 300 may skip the question asking to name the medications the patient is allergic to.

Certain embodiments provide that a user may complete paper forms in addition to, or instead of, the forms electronically provided via the form management system 300. The paper forms may be provided by the service provider and/or be printable from the form management system 300, preferably in the user's native language if possible, for completion by the user. Examples of paper patient intake forms in English as are known in the art are illustrated in FIGS. 6A-6C.

After completion of the paper form by the user, the completed paper form may be uploaded, or otherwise stored, to the form management system 300. For example, a user or service provider may upload or otherwise store the completed paper form to the form management system 300. Additionally or alternatively, the paper form may be communicated by electronic mail, facsimile, mail or any other suitable manner of communication to a system administrator or any other suitable agent with access to the form management system 300 for uploading or otherwise storing the paper form to the form management system 300. Additionally or alternatively, the answers provided in the completed form may be stored in the form management system 300 with or without a copy of the completed paper form. If the answers provided in the completed form are entered in the form management system 300, it is preferable that the actual completed paper form be kept in some form as a record of the actual answers as provided by the user.

At step 240, the form management system 300 determines if translation of the completed user form is needed. The form management system 300 may determine whether the user form completed in the user native language matches the service provider native language. If the user and service provider native languages match, the form management system 300 may skip to step 260. If the user and service provider native languages do not match, the form management system 300 may proceed to step 250.

At step 250, if translation of the completed user form is needed, the completed user form is translated and form management system 300 is updated. In certain embodiments, if the user form completed in the user native language does not match a service provider native language, the form management system 300 may send the work item for translating the user form to a queue. In certain embodiments, the queue may be one of a plurality of queues. The form management system 300 may select the queue for sending the work item based on a priority of work item, the language of the user form associated with the work item, the identity of the service provider, the available translation specialists, and/or any other suitable properties of the work item. For example, a work item associated with a completed user form for an appointment in a week may be placed in a lower priority queue than a work item associated with a completed user form for an appointment in under an hour. Additionally or alternatively, a work item associated with a completed user form to be translated from Spanish to English may be sent to a different queue than a work item associated with a completed user form to be translated from Chinese to English. In certain embodiments, queues may be any combination of a first-in-first-out queues and/or last-in-first-out queues (i.e., stacks). The form management system 300 may manage the order queues are serviced using, for example, weighted fair queuing (WFQ), strict priority, class-based queuing (CBQ), class-based weighted fair queuing (CBWFQ), and/or any other suitable queue-servicing algorithm. The work items in the queue may be continuously monitored by the form management system 300 to update queues if circumstances associated with the work item change, among other things. For example, as an appointment time draws nearer, a work item originally placed in a lower priority queue that has yet to be serviced may be moved to a higher priority queue.

Certain embodiments provide that the work items associated with the completed user form that need translation are acted upon by translation specialists and/or any suitable translation mechanism. In certain embodiments, if the user worked with a live "chat" assistance specialist while completing the user form on the form management system 300, the live "chat" assistance specialist may be tasked with translating the completed user form. In certain embodiments, the form management system 300 automatically translates data of a known format. For example, answers provided as one or more of dates, integers, check boxes, radio buttons, drop-down menus, list boxes, and the like, may be automatically translated. In certain embodiments, translations of free form answers (including dates and integers in some embodiments) provided by a user in the user form may be translated by a translation specialist, for example. In certain embodiments, translated answers do not replace the user answers but are stored alongside the user answers to maintain a record of the user provided answers, among other things.

At step 260, the form management system generates a provider form based on the completed user form and/or the translation of the completed user form. If the user and service provider native languages match at step 240, the form management system 300 may skip to step 260 to generate a provider form in a suitable format and comprising the questions and answers of the user form completed by the user. If the user and service provider native languages do not match at step 240, then after a completed user form is translated at step 250, the form management system 300 may generate a provider form in a suitable format and comprising the questions and answers of the user form completed by the user in the provider native language.

At step 270, the generated provider form is provided to the service provider for the scheduled appointment. The generated provider form or a message indicating that the provider form is available, may be communicated to the service provider via upload to a service provider system, electronic mail, facsimile, mail and/or any other suitable manner of communication. Additionally or alternatively, the provider form may be accessible for viewing, printing and/or download, among other things, by the service provider at the form management system 300. Further, the service provider may be provided with, or otherwise have access to, the completed user form in the user native language.

Figure 3:
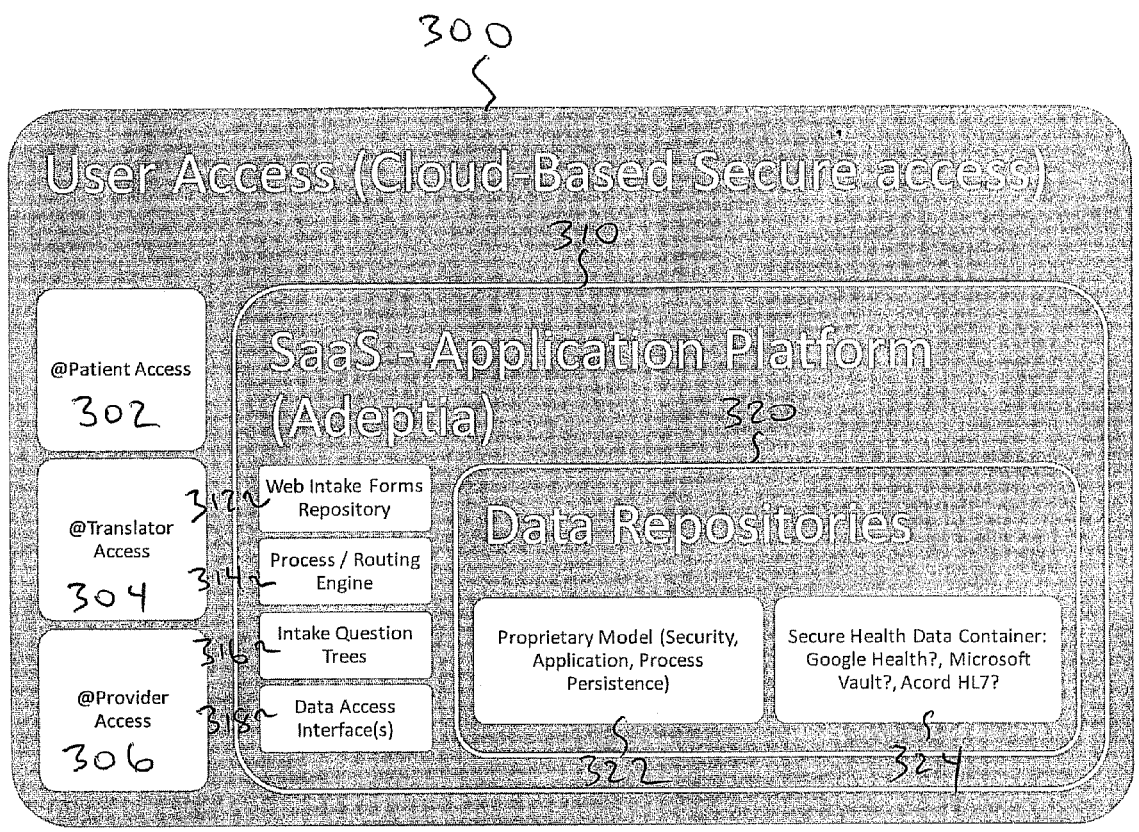
FIG. 3 is a diagram that illustrates an exemplary system for managing a form completion process used in accordance with an embodiment of the present technology.

FIG. 3 is a diagram that illustrates an exemplary system 300 for managing a form completion process used in accordance with an embodiment of the present technology. The form management system 300 may include interfaces 302, 304, 306, form repositories 312, a processing engine 314, question tree rules 316, data access interface(s) 318, and data repositories 322, 324, among other things. The components of the system 300 may communicate via wired and/or wireless connections on one or more processing units, such as computers, medical systems, storage devices, custom processors, and/or other processing units. The components, elements, and/or functionality of the interface(s) and system(s) may be implemented alone or in combination in various forms of hardware, firmware, and/or as a set of instructions in software, for example. Certain embodiments may be provided as a set of instructions residing on a computer-readable medium, such as a memory or hard disk, for execution on a general purpose computer or other processing device, such as, for example, one or more dedicated processors. The form management system 300 is illustrated in the exemplary embodiment of FIG. 3 as being a cloud-based system, where a platform as a service (Paas) is delivered to users 302, 304, 306 with access to the form management system 300. However, the present invention is not limited to the exemplary cloud-based computing embodiment illustrated in FIG. 3.

The form management system 300 may include interfaces 302, 304, 306 to provide users access to the form management system 300 over a network (e.g., the Internet). For example, in a healthcare environment, a patient may make an appointment with a healthcare provider. The healthcare provider may direct the patient to fill out the intake forms prior to the appointment by using the form management system 300. In an embodiment, the patient is provided with system access information such that the patient may access 302 a user form in the user's native language. The system access information may include login information, information for creating a login, information related to the healthcare facility, and/or any other suitable system access information. Translation specialists and service providers may also use system access information to login to the form management system 300 via interfaces 304, 306. For example, translation specialists may access 304 the form management system to translate completed user forms that need translation and provide live "chat" assistance, among other things. Service providers may access 306 the form management system 300 to enter created appointments, update user forms, upload completed user forms, and access provider forms, among other things.

Certain embodiments provide a processing engine 314 of the form management system 300. The processing engine 314 may create a work item when the form management system 300 is notified of an appointment, for example. The work item may be managed and routed throughout the workflow by the processing engine 314. As an example, if the processing engine 314 determines that a user native language associated with a completed user form does not match the native language of the service provider, the processing engine 314 may route the work item associated with the completed user form to a form translation queue for access 304 by a translation specialist. Further, once a completed user form is translated, or if translation is unnecessary, the processing engine 314 may generate the provider form and notify the provider of the completed available provider form for the appointment with the user.

In certain embodiments, form repositories 312 may store user forms for various service providers and in various languages. When a user accesses 302 the form management system 300 to complete a user form, the processing engine 314 may process a user request (e.g., language selection, form request, etc.) and retrieve and provide the appropriate form from the form repositories 312 to the user.

Certain embodiments provide question tree rules 316 for application by the processing engine 314 in displaying the appropriate question or set of questions from forms repositories 312 to a user interface 302. The form questions may be presented to the user 302 by the processing engine 314 individually or as groups of questions, among other things. The presentation of certain questions may be dependent upon answer to other questions as defined by the question tree rules 316. For example, as illustrated in the exemplary questions matrix of FIG. 7A, a question may be presented to a patient asking whether the patient is allergic to any medications. If the patient indicates that he or she is not allergic to any medications, the question tree rules 316 may specify that the question asking to name the medications the patient is allergic to is skipped.

The forms may provide different question types to the user. For example, as illustrated in FIGS. 7A-7B, the questions presented in the one or more form may request date answers, integer answers (e.g., age, weight, etc.), single choice answers (e.g., "Yes" or "No"; "Male" or "Female"; "Single", "Married", "Divorced" or "Widow/Widower"; etc.), multiple choice answers (e.g., "Check all symptoms that are bothering you:", etc.), free form, and/or any other suitable question types. The one or more forms provided by the processing engine 314 from the form repositories 312 are completed by the user in the user's native language. The answers provided by the user are stored in the form management system 300 as entered by the user. For example, the completed user forms may be stored in a data repository 324, or the like, of the form management system 300.

In certain embodiments, the form management system 300 may include data access interface(s) 318 to access external data, among other things. The form management system 300 can also include data repositories 322, 324. For example, the form management system 300 may include a data repository 322 comprising proprietary model data, such as security application data and process persistence data, and the like. As another example, the form management system may comprise one or more electronic medical record repositories 324, among other things. Completed user forms, provider forms and the like may be stored in the one or more electronic medical record repositories 324, and/or at any other suitable storage component.

Certain embodiments of the form management system 300 provide a cloud-based system that comprises a software as a service platform 310 comprising, for example, the form repositories 312, the processing engine 314, the question tree rules 316, the data access interface(s) 318 and data repositories 320, such as the proprietary model repository 322 and the secure health data container repository 324, among other things.

Figure 4:
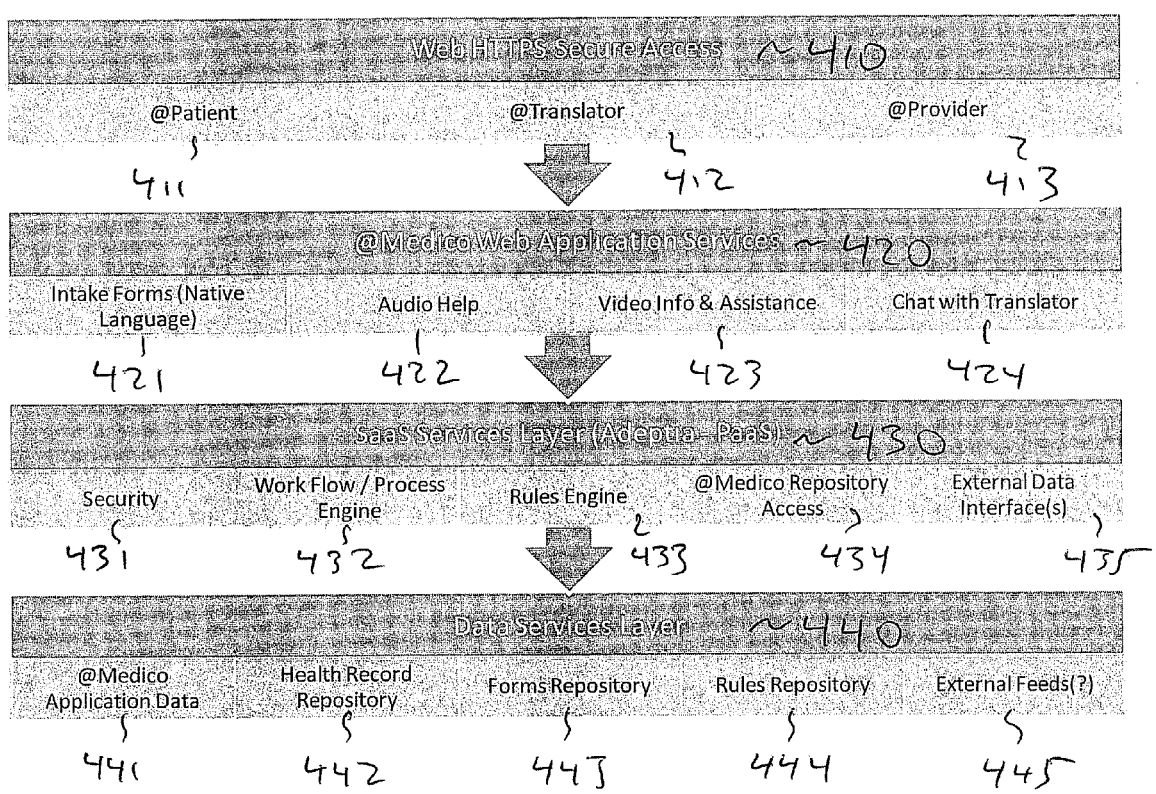
FIG. 4 is a diagram that illustrates exemplary service layers used in a system for managing a form completion process used in accordance with an embodiment of the present technology.

FIG. 4 is a diagram that illustrates exemplary service layers used in a system for managing a form completion process used in accordance with an embodiment of the present technology. The service layers 400 of the form management system 300 may comprise an access layer 410, an application services layer 420, a services layer 430 and a data services layer 440, among other things.

In certain embodiments, the access layer 410 may provide users access to the form management system 300 over a network (e.g., the Internet). For example, in a healthcare environment, a patient may make an appointment with a healthcare provider. The healthcare provider may direct the patient to fill out the intake forms prior to the appointment by using the form management system 300. In an embodiment, the patient is provided with system access information such that the patient may access 411 a user form in the user's native language. The system access information may include login information, information for creating a login, information related to the healthcare facility, and/or any other suitable system access information. Translation specialists and service providers may also use system access information to login to the form management system 300. For example, translation specialists may access 412 the form management system 300 to translate completed user forms that need translation and provide live "chat" assistance, among other things. Service providers may access 413 the form management system 300 to enter created appointments, update user forms, upload completed user forms, and access provider forms, among other things.

In certain embodiments, the application services layer 420 may provide a user, in the user's native language, with user forms 421, audio files 422, video files 423, a live "chat" application 424, and the like.

The audio files 421 may be accessible to a user for selection using buttons, drop-down menus, and/or any other suitable selection mechanisms. The selection mechanisms for the audio files may be integrated into the presented form and/or are otherwise accessible to the user via the user interface. For example, selection mechanisms for audio files may be strategically placed within the user form to assist in providing help related to specific form questions or sections of the form, among other things. As another example, selection mechanisms for form completion tools may be accessible using toolbars, icons, windows, or the like, and may be situated at any suitable location within the user interface of the patient's computing device. The audio files 421 may be used to give a user assistance in filling out the user form, among other things.

The video files 422 may also be accessible to a user for selection using buttons, drop-down menus, and/or any other suitable selection mechanisms. The selection mechanisms for the video files 422 may be integrated into the presented form and/or are otherwise accessible to the patient via the user interface. For example, selection mechanisms for the video files 422 may be strategically placed within the form to assist in providing help related to specific form questions or sections of the form, among other things. As another example, selection mechanisms for form completion tools may be accessible using toolbars, icons, windows, or the like, and may be situated at any suitable location within the user interface of the patient's computing device. The video files 422 may be used to give a user assistance in filling out the user form. Additionally or alternatively, the video files 422 may provide information regarding the scheduled appointment with the service provider, among other things.

The live "chat" application 424 may allow assistance to be provided by a translation specialist to a user of the form management system 300. The live "chat" application 424 may be accessible via any suitable selection mechanism, as discussed above with regard to the accessibility of the audio files 421 and video files 422. In certain embodiments, a pop-up "chat" box, or any other suitable messaging mechanism, may appear on a user interface if a translation specialist is available to assist the user with completing the form. The live "chat" application 424 may be presented in a live textual messaging format, as a live audio feed, and/or as a live video feed, among other things. The translation specialist may provide the user with immediate assistance regarding filling out the form. In certain embodiments, a translation specialist may also provide the translation services, if needed, to immediately complete the translation such that the provider form may be generated for access by the service provider in substantially real-time.

In certain embodiments, the services layer 430 may provide security mechanisms 431, the processing engine 432, a rules engine 433, repository access 434 and external data interface(s) 435, among other things.

The security mechanisms 431 may provide security to the form management system 300 in connection with providing secure access at the access layer 410 and data services layer 440.

The processing engine 432 may be similar in many respects to certain functionality of the processing engine 314 discussed above with regard to FIG. 3 in connection with the workflow management of work items, among other things. For example, the processing engine 432 may create a work item when the form management system 300 is notified of an appointment, for example. The work item may be managed and routed throughout the workflow by the processing engine 432. As an example, if the processing engine 432 determines that a user native language associated with a completed user form does not match the native language of the service provider, the processing engine 432 may route the work item associated with the completed user form to a form translation queue for access 412 by a translation specialist. Further, once a completed user form is translated, or if translation is unnecessary, the processing engine 432 may generate the provider form and notify the provider of the completed available provider form for the appointment with the user.

The rules engine 433 may be similar in many respects to certain functionality of the processing engine 314 discussed above with regard to FIG. 3 in connection with the application of the question tree rules 316, among other things. For example, the rules engine 433 may apply question tree rules 316 in displaying the appropriate question or set of questions in the user forms 421 at the user interface. The form questions may be presented to the user 411 by the rules engine 433 individually or as groups of questions, among other things. The presentation of certain questions may be dependent upon answer to other questions as defined by rules in a rules repository 444. For example, as illustrated in the exemplary questions matrix of FIG. 7A, a question may be presented to a patient asking whether the patient is allergic to any medications. If the patient indicates that he or she is not allergic to any medications, the rules engine 433 may skip display of the question asking to name the medications the patient is allergic to.

The repository access 434 may provide access to various repositories, for example, at the data services layer 440. The external data interface(s) 435 may provide access to various external feeds 445 at the data services layer 440.

In certain embodiments, the data services layer 440 may provide application data 441, health record repositories 442, form repositories 443, rules repositories 444 and external feed(s) 445, among other things. The application data repository 441 may store various application data used by the form management system 300 accessed by repository access 434. For example, the application data repository 441 may include proprietary model data, such as security application data and process persistence data, and the like. The health record repositories 442 may store completed user forms, provider forms and the like. The form repositories 443 may store the user forms retrieved by the rules engine 433 and provided to a user 411 at the application services layer 420, 421. The rules repository 444 may store rules applied by the rules engine 433. The external feed(s) 445 may include data accessible to the form management system 300 via the external data interface(s) 435.

Figure 5:
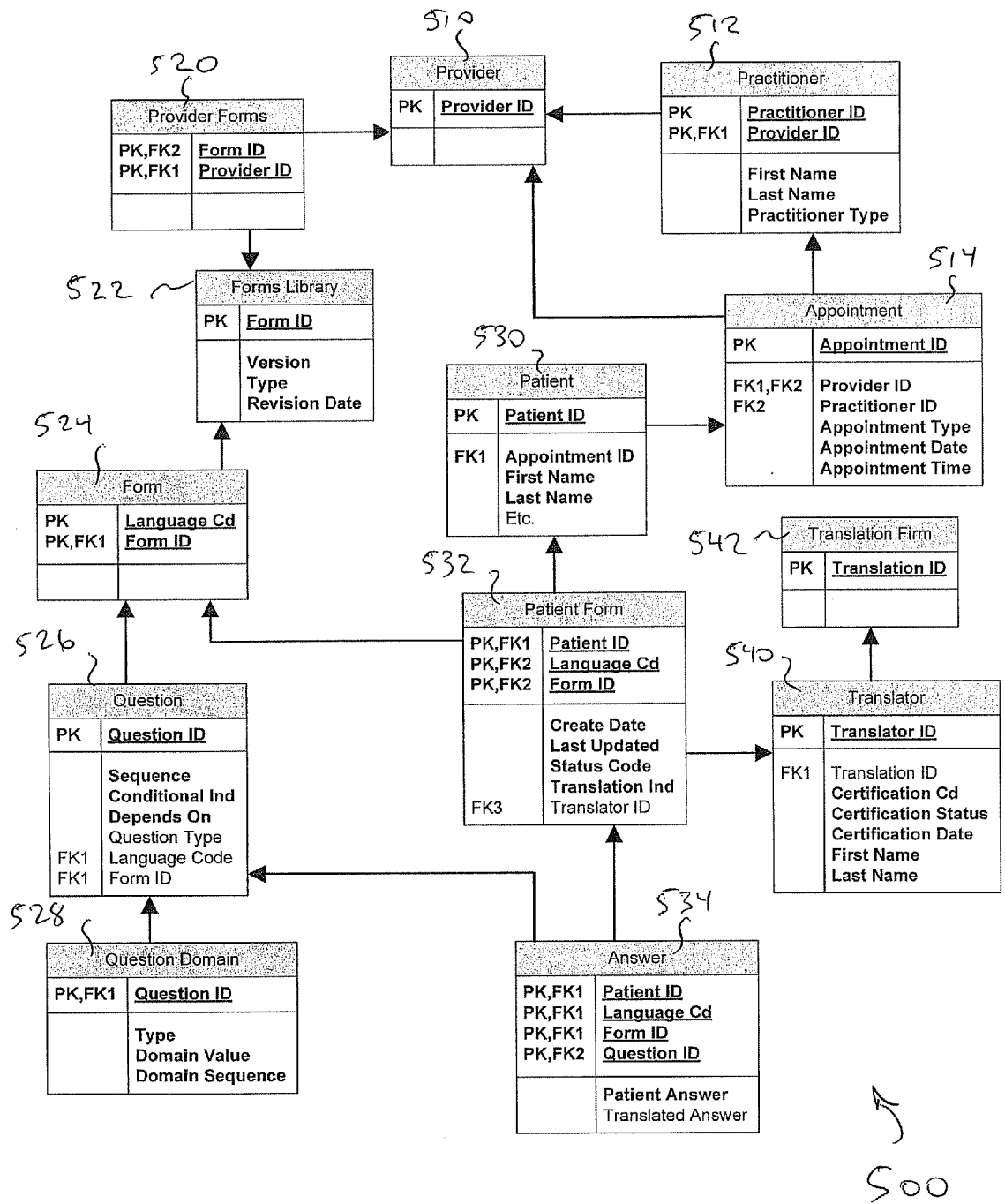
FIG. 5 is a diagram that illustrates an exemplary model representing logical relationships between various users and forms used in accordance with an embodiment of the present technology.

FIG. 5 is a diagram that illustrates an exemplary model 500 representing logical relationships between various users and forms used in accordance with an embodiment of the present technology. The exemplary model 500 of FIG. 5 illustrates a provider data entity 510 that is associated with a plurality of provider forms 520. The provider forms 520 may be stored in a forms library 522. Each form 524 stored in the forms library 522 may comprise at least one question 526. Each question 526 provided in the form 524 may be of a particular question type 528 (e.g., date, integer, single choice, multiple choice, free form, etc.).

The provider data entity 510 is also associated with one or more practitioners 512. An appointment 514 by a patient 530 may be made with a provider 510 and associated with a practitioner 512. The patient 530 may be asked by provider 510 to fill out a patient form 532, which may be a form 524 stored in the forms library 522. The patient 530 may provide answers 534 in the patient form 532 to questions 526 of form 524. If translation of the patient form 532 is needed, a translator 540 associated with a translation firm 542 may provide the translation of the patient form 532.

FIGS. 6A-6C depict exemplary paper patient intake forms as are known in the art.

FIG. 7A depicts an exemplary questions matrix used in accordance with an embodiment of the present technology. The question matrix illustrates exemplary questions of various question types broken up into various sections of a user form. Each section of the user form may be associated with a section name. As discussed above, certain questions may depend on answer from other questions.

FIG. 7B depicts an exemplary check-box section corresponding to the questions matrix illustrated in FIG. 7A as used in accordance with an embodiment of the present technology.

Thus, certain embodiments may allow for providing a form in a first language for completion by a user that speaks the first language. The form, completed by the user in the first language, is received and translated into a second language of a service provider. The translated form may be communicated to, or accessed by, the service provider.

Certain embodiments provide a method 100, 200 for managing a form completion process. The method 100, 200 comprises providing 120, 230 a user form 421 in a selected language from a form management computing device 300, 400 to a user interface. The method 100, 200 comprises receiving 120, 130 the user form with associated form answers at a form management computing device 300, 400 and determining 130, 240 whether the selected language of the user form matches a service provider language. The method 100, 200 comprises queuing 130, 250 a work item associated with the user form with associated form answers if the selected language of the user form does not match the service provider language, and dequeuing 130, 250 the work item when the user form with associated form answers is provided to a translation specialist. The method 100, 200 comprises receiving 130, 250 a translation of the user form with associated form answers at the form management computing device and generating 130, 260 a provider form based on at least one of the user form with associated form answers and the translation of the user form with associated form answers.

In various embodiments, the method 100, 200 for managing the form completion process comprises receiving 120, 230 a user login at the form management computing device 300, 400 from the user interface for providing access to the form management computing device 300, 400.

In certain embodiments, the method 100, 200 for managing the form completion process comprises receiving 120, 230 a language selection at the form management computing device 300, 400.

In various embodiments, the user form comprises a plurality of questions.

In certain embodiments, the method 100, 200 for managing the form completion process comprises presenting 120, 230 at least a portion of the plurality of questions of the user form individually at the user interface.

In various embodiments, the method 100, 200 for managing the form completion process comprises presenting 120, 230 at least a portion of the plurality of questions of the user form in groups at the user interface.

In certain embodiments, the presentation 120, 230 at the user interface of at least a portion of the plurality of questions of the user form is dependent upon a form answer to at least one of the plurality of questions.

In various embodiments, the user form comprises at least one form completion tool 421-424 in the selected language for providing form completion assistance.

In certain embodiments, the at least one form completion tool 421-424 comprises at least one audio clip 422, at least one video clip 423, and access to live assistance 424.

In various embodiments, the method 100, 200 for managing the form completion process comprises communicating 130, 270 the provider form to a service provider and/or storing 130, 270, 442 the provider form for retrieval by the service provider.

In certain embodiments, the work item is queued 130, 250 based on a priority associated with the work item.

In various embodiments, the method 100, 200 for managing the form completion process comprises determining the priority based on at least one of an appointment date and an appointment time.

In certain embodiments, the method 100, 200 for managing the form completion process comprises continuously monitoring the queued work item, and dynamically updating the priority of the queued work item.

In various embodiments, the work item is queued 130, 250 based on one or more of the selected language associated with the work item, an identity of a service provider, and an availability of translation specialists.

Various embodiments provide a non-transitory computer-readable medium encoded with a set of instructions 100, 200 for execution on a computer. The set of instructions 100, 200 comprise a presentation routine configured to provide 120, 230 a user form in a selected language to a user interface. The set of instructions 100, 200 comprise a completed form routine configured to receive 120, 230 the user form with associated form answers and a language determination routine configured to determine 130, 240 whether the selected language of the user form matches a service provider language. The set of instructions 100, 200 comprise a queuing routine configured to queue 130, 250 a work item associated with the user form with associated form answers if the selected language of the user form does not match the service provider language, and a dequeuing routine configured to dequeue 130, 250 the work item when the user form with associated form answers is provided to a translation specialist. The set of instructions 100, 200 comprise a translated form routine configured to receive 130, 250 a translation of the user form with associated form answers, and a generation routine configured to generate 130, 260 a provider form based on at least one of the user form with associated form answers and the translation of the user form with associated form answers.

In certain embodiments, the non-transitory computer-readable medium encoded with the set of instructions 100, 200 comprises an authentication routine configured to receive 120, 230 a user login for providing access to at least one of the user form and the provider form.

In various embodiments, the non-transitory computer-readable medium encoded with the set of instructions 100, 200 comprises a language selection routine configured to receive 120, 230 a language selection.

In certain embodiments, the user form comprises a plurality of questions.

In various embodiments, the non-transitory computer-readable medium encoded with the set of instructions 100,

200 comprises a question presentation routine configured to present 120, 230 at least a portion of the plurality of questions of the user form individually at the user interface.

In certain embodiments, the non-transitory computer-readable medium encoded with the set of instructions 100, 200 comprises a question presentation routine configured to present 120, 230 at least a portion of the plurality of questions of the user form in groups at the user interface.

In various embodiments, the non-transitory computer-readable medium encoded with the set of instructions 100, 200 comprises a question presentation routine configured to present 120, 230 at least a portion of the plurality of questions of the user form at the user interface. The presentation at the user interface of the at least a portion of the plurality of questions of the user form is dependent upon a form answer to at least one of the plurality of questions.

In certain embodiments, the user form comprises at least one form completion tool 421-424 in the selected language for providing form completion assistance.

In various embodiments, the at least one form completion tool comprises at least one audio clip 422, at least one video clip 423, and/or access to live assistance 424.

In certain embodiments, the non-transitory computer-readable medium encoded with the set of instructions 100, 200 comprises one or more of a provider form communication routine configured to communicate 130, 270 the provider form to a service provider, and a provider form storage routine configured to store 130, 270, 442 the provider form for retrieval by the service provider.

In various embodiments, the queuing routine is based on a priority associated with the work item.

In certain embodiments, the non-transitory computer-readable medium encoded with the set of instructions 100, 200 comprises a priority determination routine configured to determine the priority associated with the work item based on at least one of an appointment date and an appointment time.

In various embodiments, the non-transitory computer-readable medium encoded with the set of instructions 100, 200 comprises a monitoring routine configured to continuously monitor the queued work item, and an updating routine configured to dynamically update the priority of the queued work item.

In certain embodiments, the queuing routine queues 130, 250 the work item based on one or more of the selected language associated with the work item, an identity of a service provider, and an availability of translation specialists.

Certain embodiments provide a system 300, 400 for managing a form completion process. The system 300, 400 comprises one or more user interfaces 302-306, 411-413 and a processing engine 314, 432-433. The one or more user interfaces 302-306, 411-413 are configured to provide a user form in a selected language and receive the user form with associated form answers. The one or more user interfaces 302-306, 411-413 are configured to provide the user form with associated answers to a translation specialist and receive a translation of the user form with associated form answers. The processing engine 314, 432-433 is configured to determine whether the selected language of the user form matches a service provider language. The processing engine 314, 432-433 is configured to queue a work item associated with the user form with associated form answers if the selected language of the user form does not match the service provider language. The processing engine 314, 432-433 is configured to dequeue the work item when the user form with associated form answers is provided to a translation specialist. The processing engine 314, 432-433 is configured to generate a provider form based on one or more of the user form with associated form answers and the translation of the user form with associated form answers.

In various embodiments, the one or more interfaces 302-306, 411-413 is configured to receive login information. The processing engine 314, 432-433 is configured to authenticate system access in response to the login information received by the at least one user interface.

In certain embodiments, the at least one interface 302-306, 411-413 is configured to receive a language selection. The processing engine 314, 432-433 is configured to select the user form to be provided by the at least one interface.

In various embodiments, the system 300, 400 for managing a form completion process comprises at least one repository 312, 443. The user form comprises a plurality of questions stored in the at least one repository 312, 443.

In certain embodiments, the system 300, 400 for managing a form completion process comprises question tree rules 316, 444 for application by the processing engine 314, 432-433. The question tree rules 316, 444 comprise rules for presenting at least a portion of the plurality of questions of the user form individually at a user interface.

In various embodiments, the system 300, 400 for managing a form completion process comprises question tree rules 316, 444 for application by the processing engine 314, 432-433. The question tree rules 316, 444 comprise rules for presenting at least a portion of the plurality of questions of the user form in groups at a user interface.

In certain embodiments, the system 300, 400 for managing a form completion process comprises question tree rules 316, 444 for application by the processing engine 314, 432-433. The presentation at a user interface of at least a portion of the plurality of questions of the user form is dependent upon a form answer to at least one of the plurality of questions as defined the by the question tree rules 316, 444.

In various embodiments, the system 300, 400 for managing a form completion process comprises at least one repository 312, 443. One or more form completion tools 422-424 may be stored in the at least one repository 312, 443. The one or more interfaces 302-306, 411-413 may be configured to provide the one or more form completion tools 422-424 in the selected language as selected by the processing engine 314, 432-433 for providing form completion assistance.

In certain embodiments, the one or more form completion tools 422-424 comprises at least one audio clip 422, at least one video clip 423, and access to live assistance 424.

In various embodiments, the system 300, 400 for managing a form completion process comprises at least one repository 442 configured to store the provider form.

In certain embodiments, the one or more interfaces 302-306, 411-413 are configured to communicate the provider form to a service provider.

In various embodiments, the processing engine 314, 432-433 is configured to queue the work item based on a priority associated with the work item.

In certain embodiments, the processing engine 314, 432-433 is configured to determine the priority based on at least one of an appointment date and an appointment time.

In various embodiments, the processing engine 314, 432-433 is configured to continuously monitor the queued work item and dynamically update the priority of the queued work item.

In certain embodiments, the processing engine 314, 432-433 is configured to queue the work item based on one or more of the selected language associated with the work item, an identity of a service provider, and an availability of translation specialists.

While the invention has been described with reference to certain embodiments, it may be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention may include all embodiments falling within the scope of the appended claims.

The invention claimed is:

1. A method for managing a pre-defined patient intake form completion process prior to a scheduled appointment, the method comprising:
   transmitting the pre-defined patient intake form comprising a plurality of questions in a selected language from a form management computing device to a user interface, wherein at least a portion of the plurality of questions request free form answers;
   receiving a completed patient intake form corresponding with the pre-defined patient intake form at the form management computing device prior to the scheduled appointment, the completed patient intake form comprising the free form answers for translation by a translation specialist if the selected language does not match a service provider language;
   processing, at the form management computing device, the completed patient intake form to determine whether the selected language matches the service provider language;
   determining a priority of a work item associated with the completed patient intake form based on at least one of an appointment date and an appointment time of the scheduled appointment;
   queuing, by the form management computing device, the work item if the selected language does not match the service provider language, wherein the work item is queued based on the priority associated with the work item;
   dequeuing, by the form management computing device, the work item when the completed patient intake form is provided to the translation specialist based on the determined priority;
   receiving a translation of the completed patient intake form provided by the translation specialist at the form management computing device; and
   generating, by the form management computing device, a provider form based on at least one of the completed patient intake form and the translation of the completed patient intake form.

2. The method of claim 1, comprising receiving a user login at the form management computing device from the user interface for providing access to the form management computing device.

3. The method of claim 1, comprising receiving a language selection at the form management computing device.

4. The method of claim 1, comprising transmitting the provider form to the service provider.

5. The method of claim 1, comprising presenting at least a portion of the plurality of questions of the pre-defined patient intake form individually at the user interface.

6. The method of claim 1, comprising presenting at least a portion of the plurality of questions of the pre-defined patient intake form in groups at the user interface.

7. The method of claim 1, wherein presentation at the user interface of at least a portion of the plurality of questions of the pre-defined patient intake form is dependent upon a form answer to at least one of the plurality of questions.

8. The method of claim 1, wherein the pre-defined patient intake form comprises at least one form completion tool that provides form completion instructions in the selected language for providing form completion assistance.

9. The method of claim 8, wherein the at least one form completion tool comprises:
   at least one audio clip,
   at least one video clip, and
   access to live assistance.

10. The method of claim 1, comprising storing the provider form for retrieval by the service provider.

11. The method of claim 1, comprising:
   continuously monitoring the queued work item, and
   dynamically updating the priority of the queued work item.

12. The method of claim 1, wherein the work item is queued based on at least one of:
   the selected language associated with the work item,
   an identity of the service provider, and
   an availability of translation specialists.

13. A non-transitory computer-readable medium encoded with a set of instructions for execution on a computer, the set of instructions comprising:
   a presentation routine configured to provide a pre-defined patient intake form comprising a plurality of questions in a selected language to a user interface, wherein at least a portion of the plurality of questions request free form answers;
   a completed form routine configured to receive a completed patient intake form corresponding with the pre-defined patient intake form prior to a scheduled appointment, the completed patient intake form comprising the free form answers for translation by a translation specialist if the selected language does not match a service provider language;
   a language determination routine configured to process the completed patient intake form to determine whether the selected language matches the service provider language;
   a priority determination routine configured to determine a priority of a work item associated with the completed patient intake form based on at least one of an appointment date and an appointment time of the scheduled appointment;
   a queuing routine configured to queue the work item if the selected language does not match the service provider language, wherein the work item is queued based on the priority associated with the work item;
   a dequeuing routine configured to dequeue the work item when the completed patient intake form is provided to the translation specialist based on the determined priority;
   a translated form routine configured to receive a translation of the completed patient intake form provided by the translation specialist; and
   a generation routine configured to generate a provider form based on at least one of the user completed patient intake form and the translation of the user completed patient intake form.

14. The non-transitory computer-readable medium encoded with the set of instructions of claim 13, comprising an authentication routine configured to receive a user login for providing access to at least one of the user pre-defined patient intake form and the provider form.

15. The non-transitory computer-readable medium encoded with the set of instructions of claim 13, comprising a language selection routine configured to receive a language selection.

16. The non-transitory computer-readable medium encoded with the set of instructions of claim 13, comprising a provider form communication routine configured to transmit the provider form to a service provider.

17. The non-transitory computer-readable medium encoded with the set of instructions of claim 13, comprising a question presentation routine configured to present at least a portion of the plurality of questions of the pre-defined patient intake form individually at the user interface.

18. The non-transitory computer-readable medium encoded with the set of instructions of claim 13, comprising a question presentation routine configured to present at least a portion of the plurality of questions of the pre-defined patient intake form in groups at the user interface.

19. The non-transitory computer-readable medium encoded with the set of instructions of claim 13, comprising a question presentation routine configured to present at least a portion of the plurality of questions of the pre-defined patient intake form at the user interface, wherein presentation at the user interface of the at least a portion of the plurality of questions of the pre-defined patient intake form is dependent upon a form answer to at least one of the plurality of questions.

20. The non-transitory computer-readable medium encoded with the set of instructions of claim 13, wherein the pre-defined patient intake form comprises at least one form completion tool that provides form completion instructions in the selected language for providing form completion assistance.

21. The non-transitory computer-readable medium encoded with the set of instructions of claim 20, wherein the at least one form completion tool comprises:
   at least one audio clip,
   at least one video clip, and
   access to live assistance.

22. The non-transitory computer-readable medium encoded with the set of instructions of claim 13, comprising a provider form storage routine configured to store the provider form for retrieval by the service provider.

23. The non-transitory computer-readable medium encoded with the set of instructions of claim 13, comprising:
   a monitoring routine configured to continuously monitor the queued work item, and
   an updating routine configured to dynamically update the priority of the queued work item.

24. The non-transitory computer-readable medium encoded with the set of instructions of claim 13, wherein the queuing routine queues the work item based on at least one of:
   the selected language associated with the work item,
   an identity of the service provider, and
   an availability of translation specialists.

25. A system for managing a pre-defined patient intake form completion process prior to a scheduled appointment, the system comprising:
   at least one interface configured to:
      provide a pre-defined patient intake form comprising a plurality of questions in a selected language, wherein at least a portion of the plurality of questions request free form answers,
      receive a completed patient intake form corresponding with the pre-defined patient intake form prior to the scheduled appointment, the completed patient intake form comprising the free form answers for translation by a translation specialist if the selected language does not match a service provider language,
      provide the completed patient intake form to the translation specialist, and
      receive a translation of the completed patient intake form; and
   a processing engine configured to:
      process the completed patient intake form to determine whether the selected language matches the service provider language,
      determine a priority of a work item associated with the completed patient intake form based on at least one of an appointment date and an appointment time of the scheduled appointment,
      queue the work item if the selected language does not match the service provider language, wherein the work item is queued based on the priority associated with the work item,
      dequeue the work item when the completed patient intake form is provided to the translation specialist based on the determined priority, and
      generate a provider form based on at least one of the completed patient intake form and the translation of the completed patient intake form provided by the translation specialist.

26. The system of claim 25, wherein the at least one interface is configured to receive login information, and wherein the processing engine is configured to authenticate system access in response to the login information received by the at least one user interface.

27. The system of claim 26, wherein the at least one interface is configured to receive a language selection, and wherein the processing engine is configured to select the pre-defined patient intake form to be provided by the at least one interface.

28. The system of claim 25, comprising at least one repository and wherein the plurality of questions of the pre-defined patient intake form is stored in the at least one repository.

29. The system of claim 28, comprising question tree rules for application by the processing engine, wherein the question tree rules comprise rules for presenting at least a portion of the plurality of questions of the pre-defined patient intake form individually at a user interface.

30. The system of claim 28, comprising question tree rules for application by the processing engine, wherein the question tree rules comprise rules for presenting at least a portion of the plurality of questions of the pre-defined patient intake form in groups at a user interface.

31. The system of claim 28, comprising question tree rules for application by the processing engine, wherein presentation at a user interface of at least a portion of the plurality of questions of the pre-defined patient intake form is dependent upon a form answer to at least one of the plurality of questions as defined the by the question tree rules.

32. The system of claim 25, comprising at least one repository, wherein at least one form completion tool that provides form completion instructions is stored in the at least one repository, and wherein the at least one interface is configured to provide the at least one form completion tool in the selected language as selected by the processing engine for providing form completion assistance.

33. The system of claim 32, wherein the at least one form completion tool comprises:
   at least one audio clip,
   at least one video clip, and
   access to live assistance.

34. The system of claim 25, comprising at least one repository configured to store the provider form.

35. The system of claim 25, wherein the at least one interface is configured to communicate the provider form to a service provider.

36. The system of claim 25, wherein the processing engine is configured to continuously monitor the queued work item and dynamically update the priority of the queued work item.

37. The system of claim 25, wherein processing engine is configured to queue the work item based on at least one of:
- the selected language associated with the work item,
- an identity of the service provider, and
- an availability of translation specialists.

* * * * *